United States Patent Office 2,785,050
Patented Mar. 12, 1957

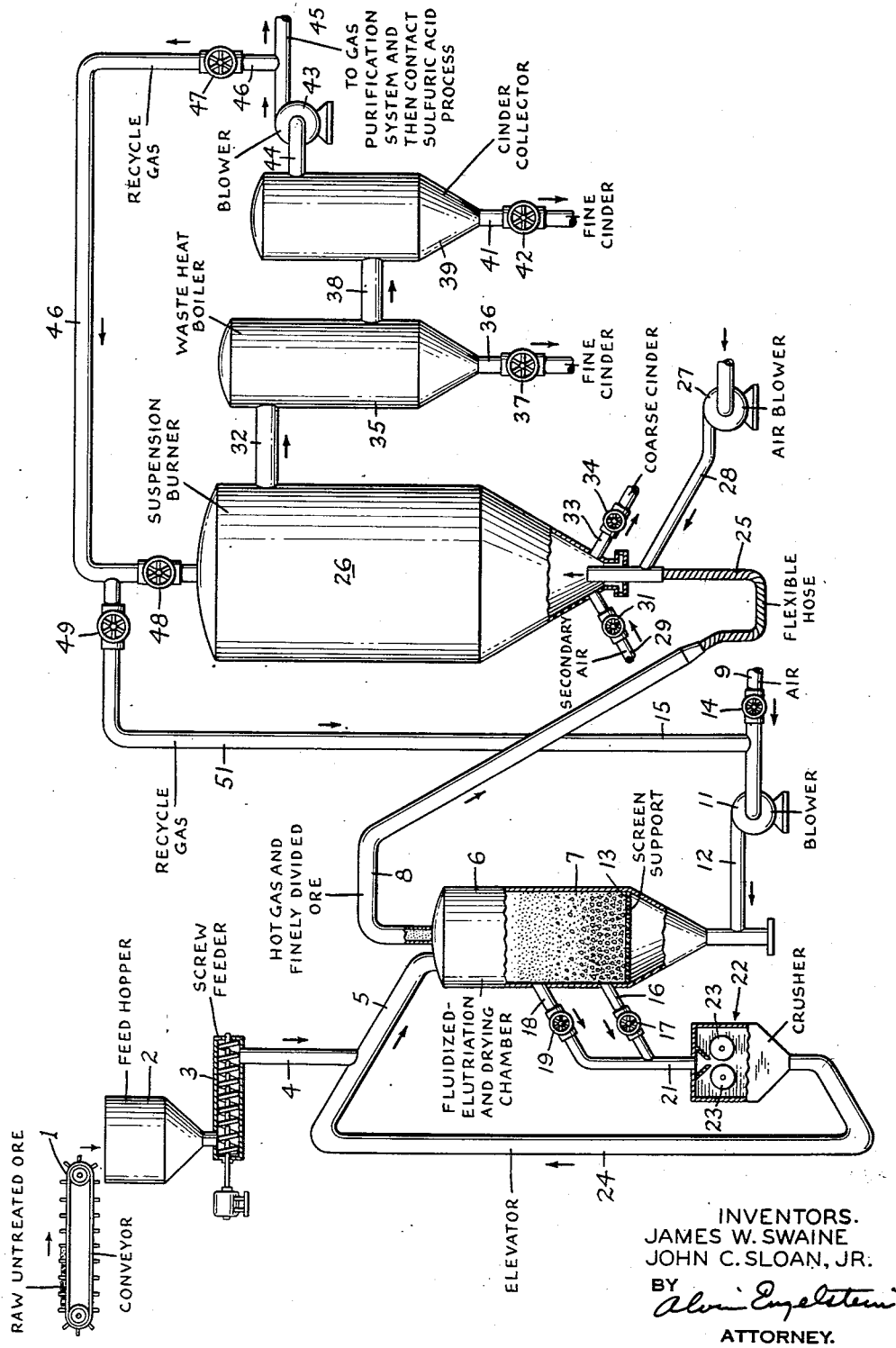

2,785,050

TWO-STAGE FLUID-SUSPENSION ROASTING OF IRON SULFIDE ORE

James W. Swaine, Manhasset, N. Y., and John C. Sloan, Jr., Neptune, N. J., assignors to Allied Chemical & Dye Corporation, New York, N. Y., a corporation of New York Application August 21, 1952, Serial No. 305,643

5 Claims. (Cl. 23—177)

This invention relates to the treatment of sulfide ore and more particularly, refers to a new and improved process for converting metal sulfides into $SO_2$ gas and metal oxides.

Frasch sulfur is probably the cheapest source of raw material for conversion into $SO_2$, $SO_3$ and $H_2SO_4$. Unfortunately, this raw material is in short supply. Consequently industry has intensified its efforts to provide other means to meet the demand for sulfur oxides and sulfuric acid and to improve known methods of producing sulfur dioxide and sulfuric acid. There are available vast deposits of naturally occurring sulfur ores, particularly iron pyrites and pyrrhotite, the former considered to have the empirical formula $FeS_2$ and the latter, $FeS$, $Fe_7S_8$ or $Fe_{10}S_{11}$, dependent on the mine from which it was derived. Sulfur and sulfur dioxide have been, and are to some extent, commercially produced from iron pyrites and pyrrhotite, usually when Frasch sulfur was not available at an economical price, as for example when freight becomes a large item of cost due to the necessity of shipping the sulfur a far distance to the site of the sulfuric acid plant.

Two methods are commonly employed in industry for roasting metallic sulfide ores; the so-called "bed" and "suspension" roasting operations. The bed process has the drawbacks of requiring the use of mechanically operated hearths of complicated construction and operation involving considerable initial and maintenance expense. Also, the cinder product resulting from bed roasting frequently is incompletely oxidized and contains an amount of sulfur making the cinder unsuitable for reduction to iron. Cinder having a high sulfur content, roughly in excess of 1% sulfur, has negligible sales value and for all practical purposes is a waste product and a nuisance. Thus, to make ore roasting commercially more attractive, it is desirable to produce a low sulfur cinder which can be disposed of readily at a value to compensate, at least in part, for the cost of conducting the roasting operation.

Suspension roasting involves roasting ore in finely divided state while in gaseous suspension in an oxidizing gas such as air. Suspension roasting is advantageous over bed roasting in that less complicated apparatus and operation are required and, of great importance, more complete oxidation of the ore can be attained to produce a cinder sufficiently low in sulfur content to adapt it for reduction to metallic iron. However, in order to successfully roast ore in a suspension burner, it is necessary to reduce the ore to finely divided particles of the size of about 40–60 mesh or smaller. As recognized in the art, grinding of ore to such a fine state is a very costly operation and, consequently, suspension roasting has limited application. Generally, suspension roasting has been found economical only when there is available a supply of flotation concentrate which is a by-product from the milling in a mining operation and consists of pyrites or pyrrhotite of 40 mesh down to 300 mesh or lower.

One object of the present invention is to provide an efficient, economical, continuous process for converting metallic sulfide ores into sulfur dioxide and cinder low in sulfur content.

Another object of this invention is to provide an improved method of comminuting, elutriating and drying sulfide ore.

A further object of this invention is to provide improved means and method in a unitary system of converting ore of large particle size to a finely divided state and concomitantly roasting the ore to produce sulfur dioxide and cinder adapted for use in reduction to metallic iron.

Further objects and advantages will be apparent from the following description and accompanying drawing.

In accordance with the present invention, elutriation, drying, preheating, partial oxidation and comminuting of ore may be simultaneously accomplished by continuously introducing ore into an enlarged vertical zone at a rate sufficient to maintain a bed of solids therein, continuously passing a stream of air upwardly through the bed of solids at a velocity sufficiently high to maintain substantially all of the solids in the bed in a fluid state, and to suspend in the stream of air, solids of particle size not greater than 40 mesh, continuously discharging from the enlarged zone the stream of gas containing suspended therein the finely divided particles of ore, withdrawing a portion of the large size particles of ore from the bed in the enlarged zone, crushing said large size particles, returning said crushed ore to the enlarged zone for further contact with the upwardly rising stream of air therein, and regulating the rate of introduction of ore and air into the enlarged zone so as to maintain therein a temperature in excess of about 800° F. and below about 1800° F., preferably between 1300° F. and 1500° F., thereby effecting elutriation, drying and partial roasting of the ore.

A specific embodiment of the invention comprises introducing ore into an enlarged vertical zone in an amount sufficient to maintain a bed of solids therein, maintaining the bed of solids in a fluid condition by passing a stream of gas upwardly through the bed of solids at a velocity sufficiently high to carry in suspension substantially only particles of ore of a size not in excess of 40 mesh, removing a portion of the bed of solids containing large particles of ore, crushing said large particles of ore and recycling said crushed ore to the enlarged zone for further contact with the stream of oxidizing gas, regulating the rate of introduction of ore and oxidizing gas into the enlarged zone to maintain therein a temperature between about 1300° F. and 1500° F., thereby effecting drying and partial roasting of the ore, discharging hot gases containing suspended finely divided particles of ore substantially not in excess of 40 mesh size from the space above the fluid bed of solids in the enlarged zone, passing the hot gases containing suspended particles of ore together with additional air upwardly through a second enlarged zone, regulating the introduction of additional air into the second enlarged zone to maintain a temperature of about 1800° F. therein and to effect substantially complete oxidation of the suspended particles of ore, discharging the $SO_2$ containing gases and roasted ore from the enlarged zone, separating the cinder from the gases, cooling the $SO_2$ containing gases, recycling a portion of the cooled $SO_2$ containing gases to the second enlarged zone to aid in maintaining the temperature therein, and introducing another portion of the cooled $SO_2$ containing gases into the bottom of the first enlarged zone to provide a sufficiently high velocity to maintain the bed of solids in a fluid condition and to elutriate therefrom finely divided particles of ore.

The accompanying drawing is a diagrammatic flow sheet illustrating one method of practicing the present invention.

Referring to the drawing, raw, untreated ore consisting of iron pyrites or pyrrhotite or a mixture of both, crushed to a size desirably not exceeding ½" in diameter, is transferred by conveyer 1 into feed hopper 2. Ordinarily, the raw, untreated ore from the mine is crushed to a particle size not exceeding about ½" diameter, a relatively inexpensive operation, and the crushed ore loaded in open freight cars and then shipped to the refinery for roasting. Such ore contains appreciable amounts of moisture, naturally occurring or resulting from exposure to weather conditions in transit. From past experience, it has been found that ore containing moisture in excess of about 0.3–0.5% by weight of the ore causes agglomeration of the particles of ore which when subjected to roasting do not remain in suspension and are incompletely roasted resulting in high-sulfur cinder not satisfactory for reduction to iron. Thus, ore, to be successfully roasted in a suspension burner, must be preliminarily treated to reduce it to a fine particle size and also dried to a low moisture content.

The raw ore, equal in amount to the desired feed rate in a suspension burner, is charged into the system through a pressure seal-type screw 3 down through conduits 4 and 5 into fluidized-elutriation and drying chamber 6. A chamber 6 of about 4–10 feet in diameter will be satisfactory for most commercial operations. The raw ore is immediately mixed into the bed of solids 7 contained in chamber 6 by the violent turbulent action of the bed. A portion of the oxidizable content of the ore reacts with oxygen contained in the fluidizing gas passing upwardly through the bed and sufficient heat is generated to raise the bulk temperature of the ore particles and gas leaving the top of chamber 7 through conduit 8 to a temperature in excess of 1300° F.

Fluidizing and oxidizing gas, preferably air, enters from the atmosphere through line 9 and is forced by blower 11 through line 12 into the bottom of chamber 6, through screen support 13, and upwardly through the bed of solids 7. The gas passing upwardly in chamber 6 through bed 7 should be at a sufficiently high velocity to maintain the bed in a fluid state and simultaneously elutriate from the bed particles of ore not exceeding 40 mesh size. This velocity will vary depending on the characteristics of the solids used, as will be now explained. At low gas velocities, the bed of solids remains fixed and the individual particles do not move. As the gas velocity is increased, a point is reached at which the bed becomes expanded and is at the absolute minimum bulk density possible, about 55–70% of original bulk density, without movement of the individual particles relative to each other. This condition may be referred to as the state of "incipient fluidization." A slight increase in gas velocity will then cause the bed to become fluidized with only insignificant carry-over of the finer particles. As the velocity is further increased, action of the bed becomes more and more violent with the formation of two distinct phases: (a) a "dense phase" at the base of the vessel containing most of the solids, and (b) a "dilute phase" containing only a relatively small proportion of solids. Further increase in velocity will cause the densities of the dense phase and dilute phase to become equal, forming a single dispersed suspension similar to the nature of a pneumatic conveying system. In the present invention, the velocity through the bed of solids 7 should be sufficiently high to maintain at least two distinct phases, namely a lower dense phase and an upper dilute phase, and to carry over in suspension in the gas, particles of ore smaller than 40 mesh size. The formation of a dense phase and a dilute phase in chamber 6 may be visually observed by means of sight glasses or by means of pressure differentials not shown in the drawing. The properties of the fluidizing gas within the range of operating conditions, such as gas density, pressure, temperature and viscosity have little effect on fluidization of the bed of solids. The effect of characteristics of the solids is much more pronounced. Solids characteristics which materially effect fluidization, are density, shape, surface roughness, diameter, and size distribution grading. Merely by way of illustration, a linear gas velocity of 7–9 feet per second will elutriate and maintain in fluid condition a bed of ore solids having the following composition:

| Mesh size: | Percent |
|---|---|
| +4 | 2.7 |
| −4+8 | 28.0 |
| −8+14 | 13.9 |
| −14+48 | 11.3 |
| −48+65 | 5.2 |
| −65+100 | 5.4 |
| −100+200 | 11.7 |
| −200 | 21.8 |

The amount of air, or more accurately, the amount of oxygen, should be sufficient to maintain the bulk temperature of the bed 7 above the auto-ignition point of the ore, about 800° F., and below the sintering temperature, about 1800° F., in order to attain rapid drying and reaction rate, reduce explosion hazards and provide highly preheated feed to the suspension burner. Preferred temperature range is between 1300° F. and 1500° F. The system should preferably be operated under superatmospheric pressure because of simplified gas handling requirements—a pressure of approximately 1 to 2 p. s. i. g. will be found adequate. Excessive high pressures are unnecessary and add to the investment cost. The amount of air required will be dependent in part upon the moisture content of the ore, the quantity of air of course increasing with wetter ores. As is apparent, the amount of air can be controlled by regulating the air intake of line 9 by means of valve 14 and blower 11. If it is found that the amount of air introduced into chamber 7 is adequate to maintain the bed of solids 7 at the desired temperature and to properly dry the ore therein, but insufficient to elutriate the bed of solids 7, then a non-oxidizing gas, as for example, recycle gas, which is primarily a mixture of nitrogen and $SO_2$, is added through conduit 15 to the stream of air entering through line 9 in an amount sufficient to maintain the bed of solids 7 in a fluid state and to elutriate fine particles therefrom. Complete oxidation of the ore in chamber 6 is not accomplished or desired—only partial oxidation of the ore is effected in chamber 6 and completion of oxidation occurs in the suspension burner. Ordinarily, it will be found that 20–40% of the total air required for complete oxidation of the ore will be introduced into fluidized chamber 7 and 80–60% of the total air will be introduced into the suspension burner. An amount of recycle gas up to 25% entering through line 15, based on the amount of air entering through line 9, will generally be found sufficient to impart the required velocity of the gas stream moving up through the bed of solids 7 in chamber 6. As is conventional, samples of the stream passing through line 8 may be periodically withdrawn and analyzed to make certain that the ore particles suspended in the gas stream are of sufficient fineness.

Attrition of the bed of solids 7 may be promoted by the addition of an inert grinding medium to the bed of solids. This material can consist of silica, alumina, silica carbide or other inert compounds in the form of either natural or manufactured shapes, which are substantially inert to temperature, corrosion and abrasion. Sizes of this medium are to be graduated within the limits of the largest particles which can be properly agitated with the fluidizing gas to the smallest particle which will not be carried out of the system by the exit gas, or stated another way, the inert grinding material should be of a graduated size to be in a fluid state, but not elutriated from the bed of solids. Desirably, the inert grinding material should range from a particle size of about ¼"–⅛" diameter, down to a size not to exceed about 40 mesh in fineness. The inert grinding medium also functions as a heat storage medium aiding in maintaining uniform temperatures in the bed of solids 7.

A portion of the bed of solids 7 is continuously or intermittently withdrawn through the bottom bed outlet 16 controlled by valve 17 or the top bed outlet 18 controlled by valve 19, or both, and passed down through conduit 21 into crusher designated by numeral 22, to reduce any agglomerates and massive ore particles which resist the grinding action of the inert material in the bed of solids 7. Crusher 22 may be a conventional roller crusher having rolls 23 spaced apart a distance of approximately 5/16″–3/16″ to avoid crushing the inert grinding medium. The preliminary treatment of the ore in chamber 6 facilitates attrition of the solids because of composition changes due to heating and reaction, internal stress due to thermal shock, and mechanical erosion.

The crushed ore from crusher 22 is then returned to the fluidized-drier vessel 6 by means of elevator 24 which may be a conventional heat-resistant, sealed, bucket elevator or other suitable conveyer.

The operation of the fluidized-drying chamber was described particularly with reference to the treatment of large size raw untreated iron pyrites or pyrrhotite. The fluidized-drying operation in chamber 6 is also applicable to the treatment of flotation concentrate, which, as previously mentioned, is a by-product from the mining industry and generally consists of finely divided sulfide ore of below 60–80 mesh size. Flotation ore as received, is unsuitable for introduction into a suspension burner and must be given a preliminary treatment because it contains appreciable amounts of moisture and is in the form of agglomerates or clumps. Conventional practice is to preliminarily grind the flotation ore in a ball mill and pass a non-oxidizing gas at a temperature of about 600–700° F. through the flotation ore to dry it. The dried ground flotation concentrate is then introduced into a suspension burner. In the present invention, the flotation ore may be passed from feed hopper 2 down through screw feeder 3, conduits 4 and 5, into fluidization drying chamber 6 wherein it is subjected to fluidization and elutriation in a manner previously described. Some of the advantages over the conventional practice of grinding and drying are (a) the ore particles swept from the fluidization chamber are partially oxidized, which reduces the amount of oxidation to be done in the suspension burner, (b) the ore particles and gas are preheated, which increases the burning capacity of the suspension burner. The net effect of these advantages are to increase the degree of desulfurization of ore in the suspension burner, resulting in greater output of $SO_2$ per unit of charged ore and a more useful cinder by-product.

When employing flotation concentrate as the feed charge to the fluidized drying chamber 6, it may be unnecessary to employ crusher 23 or to employ it only intermittently to break up the agglomerates of ore which are resistant to attrition in chamber 6.

The particles of partially roasted ore suspended in hot gas substantially free from oxygen and containing $SO_2$ are released from the top of chamber 6, pass down through conduit 8 and flexible hose 25 and up into the bottom of suspension burner 26. Additional air from the atmosphere in amount sufficient to cause complete oxidation of the ore is forced by air-blower 27 through conduit 28, commingled with the stream of hot gas containing suspended ore particles and the mixture passed upwardly through suspension roaster 26. If desired, only a portion of the air may be supplied by air-blower 27, the remainder of the air necessary to effect substantially complete combustion being brought in as secondary air through an opening 29 controlled by valve 31 or plurality of such openings near the bottom of chamber 26. Ordinarily, the suspension burner operates at slight sub-atmospheric pressure which makes it unnecessary to employ a blower for the introduction of secondary air through opening 29. The fine particles of ore are blown upwardly through suspension burner 26 and discharged from the top thereof through outlet 32. During the upward passage of the ore particles through suspension burner 26, the sulfide ore reacts with the oxygen to produce sulfur dioxide and iron oxide. As a result of this highly exothermic reaction, the temperature of the solids in the roaster 26 is in excess of 1800° F., generally between 2000–2400° F. Most of the cinder is carried out of the suspension burner 26 through line 32. Some of the coarse cinder settles to the bottom of chamber 26 and may be discharged therefrom through line 33 and valve 34.

The gases and cinder discharging from the top of suspension burner 26 through opening 32 pass through waste heat boiler 35 wherein most of the cinder settles out and is discharged through line 36 and valve 37.

Gases together with some cinder from waste heat boiler 35 pass through opening 38 into cinder collector 39 wherein further settling of the cinder takes place to be discharged through line 41 and valve 42. The gases leaving collector 39 are at a temperature of about 600°–800° F. Blower 43 sucks the cooled $SO_2$ containing gases from cinder collector 39 through line 44 and directs them through conduit 45 to conventional gas purification system and then contact sulfuric acid process for the production of sulfuric acid. A portion of the gases discharging through line 45 are returned via line 46, valves 47 and 48 to the top of suspension burner 26. One of the purposes of returning cooled recycle gas to the top of the suspension burner is to maintain a temperature at the top of the burner near the outlet at about 1800° F. to retard fusion of the ore at the outlet of chamber 26. Another portion of the recycle $SO_2$ gas is directed through line 46, valve 49 and line 51 into the inlet of blower 11 wherein it passes upwardly together with air through the bed of solids 7 in chamber 6.

We have found that as a result of our two-stage fluid-suspension roasting operation, coupled with classification, elutriation, drying and preheating of the ore particles, that the cinder produced is lower in sulfur content than normally produced in the conventional method of suspension burning, or alternatively, for the same sulfur content, we can obtain a greater throughput of ore as compared to conventional suspension roasting. Another advantage resulting from the use of our fluidized-drying system in combination with the suspension burner is provision of more uniform feed to the suspension burner which in turn minimizes pressure variations in the suspension burner and secondary difficulties arising from this source.

The following example illustrates one method of carrying out the present invention:

Raw untreated pyrrhotite ore having a particle size distribution of approximately 25% of +4 mesh; 12% of −4+8 mesh; 10% of −8+14 mesh; 5% of −48+65 mesh; 8% of −65+15 mesh; 12% of −100+200 mesh; and 28% of −200 mesh; and containing about 4% moisture is introduced into a fluidized drying chamber at the rate of approximately 16½ net tons pyrrhotite per hour. The fluidized-drying chamber has a cross-sectional area of 25 square feet and a height of approximately 16 feet. Near the bottom of the fluidized-drying chamber is disposed perforated plate supporting a bed of inert sand composed of particles having a graduated size from about ¼″ diameter graduated down to a minimum of 40 mesh. The depth of the inert body is approximately 1 foot. Air, in the amount of 3400 C. F. M. standard condition together with 15% cooled recycle for control, is passed under pressure of 1 p. s. i. g. into the bottom of fluidized-drying chamber beneath the perforated plate passing upwardly through the bed of solids and inert material, maintaining the bed in a fluidized state at a temperature of 1400–1500° F. Approximately 10 feet of void space above the turbulent bed of solids serves as disengagement volume for coarser particles. The finer particles, i. e. particles less than 60 mesh, are swept out of the chamber with the gas discharging therefrom. A portion of the dense phase of the bed of solids at the rate of about 5 tons per hour of ore are withdrawn crushed and returned to the top of the fluidized-drying chamber. The hot exit gas from the fluidized-drying chamber containing suspended fine ore particles, is passed directly into the bottom of a suspension burner where, together with additional air at the rate of about 14,000 cubic feet total per minute also introduced into the bottom of the suspension burner, as primary and secondary air, the fine particles are blown upwardly through the suspension burner and roasted at a temperature of 1800–2400° F. The suspension burner has a diameter of 25 feet and a height of 50 feet. $SO_2$ containing gas and cinder are discharged from the suspension roaster, the cinder separated therefrom, the gas partially cooled and then directed to gas purification and further treatment into sulfuric acid. A portion of cooled gas is recycled to the top of the suspension burner to maintain the temperature at the top at about 1800° F. Another portion of the recycle gas is commingled with the air introduced into the bottom of the fluidized-drying chamber. The gas product leaving the suspension roaster contains approximately 12% $SO_2$. The cinder product has a sulfur content of about 0.4%, which cinder is suitable for use in the manufacture of iron and steel.

Although certain preferred embodiments of the invention have been disclosed for purpose of illustration it will be evident that various changes and modifications may be made therein without departing from the scope and spirit of the invention.

We claim:

1. A continuous two-stage fluid-suspension process for converting metal sulfide ore selected from the group consisting of iron pyrites and pyrrhotite into sulfur dioxide and low-sulfur cinder which comprises maintaining a fluidized bed of divided sulfide ore particles supported on a perforated plate in a first zone, introducing metal sulfied ore into said fluidized bed at a rate sufficient to maintain a fluidized bed in said first zone, passing a stream of oxygen-containing gas upwardly through the perforated plate and fluidized bed at a velocity sufficiently high to maintain the solids in the bed of a particle size greater than 40 mesh in a fluid state and to elutriate from the fluidized bed solids of particle size not greater than 40 mesh as a dispersed suspension carried by the stream of gas leaving the top of the fluidized bed, regulating the rate of introduction of ore and oxygen-containing gas into the first zone to maintain therein a temperature in excess of about 800° F. and below 1800° F. thereby effecting drying and partial roasting of the ore, discharging the stream of gas containing the dispersed suspension of particles not greater than 40 mesh from the first zone at a point above the fluidized bed, passing said stream of gas containing the dispersed suspension of particles not greater than 40 mesh without separation of the dispersed particles from the gas through a second suspension-roasting zone larger than the first zone in which second zone the dispersed suspension of particles are further roasted, introducing additional oxygen-containing air into the suspension-roasting zone to maintain a temperature in excess of 1800° F. therein and to effect substantially complete oxidation of the particles of ore in dispersed suspension, discharging $SO_2$ containing gas and roasted ore from the suspension-roasting zone, and separating cinder from the discharged gas.

2. A continuous two-stage fluid-suspension process for converting metal sulfide ore selected from the group consisting of iron pyrites and pyrrhotite into sulfur dioxide and low-sulfur cinder which comprises introducing the ore into and maintaining a fluidized bed composed of divided sulfide ore particles and particles of an inert grinding medium having a particle size within the range of about 1/8" diameter to about 40 mesh suppported on a perforated plate in a first zone, passing a stream of gas containing oxygen upwardly through the perforated plate and fluidized bed containing inert grinding medium and ore at a velocity sufficiently high to maintain the solids in the bed of a particle size greater than 40 mesh in a fluid state and to elutirate from the fluidized bed solids of particle size not greater than 40 mesh as a dispersed suspension carried by the stream of gas leaving the top of the fluidized bed, regulating the rate of introduction of ore and gas containing oxygen into the first zone to maintain therein a temperature in excess of about 800° F. and below 1800° F. thereby effecting drying and partial roasting of the ore, discharging the stream of gas containing the dispersed suspension of particles not greater than 40 mesh from the first zone at a point above the fluidized bed, passing said stream of gas containing the dispersed suspension of particles not greater than 40 mesh without separation of the dispersed particles from the gas through a second suspension-roasting zone larger than the first zone in which second zone the dispersed suspension of particles are further roasted, introducing additional gas containing oxygen into the suspension-roasting zone to maintain a temperature in excess of 1800° F. therein and to effect substantially complete oxidation of the particles of ore in dispersed suspension, discharging $SO_2$ containing gas and roasted ore from the suspension-roasting zone, and separating cinder from the discharged gas.

3. A continuous two-stage fluid-suspension process for converting iron sulfide ore into sulfur dioxide and low-sulfur cinder which comprises introducing the ore into and maintaining a fluidized bed composed of divided sulfide ore particles and particles of inert grinding medium having a particle size within the range of about 1/8" diameter to about 40 mesh supported on a perforated plate in a first zone, passing a stream of gas containing oxygen upwardly through the perforated plate and fluidized bed containing inert grinding medium and ore at a velocity sufficiently high to maintain the solids in the bed of a particle size greater than 40 mesh in a fluid state and to elutriate from the fluidized bed solids of particle size not greater than 40 mesh as a dispersed suspension carried by the stream of gas leaving the top of the fluidized bed, regulating the rate of introduction of ore and gas containing oxygen into the first zone to maintain therein a temperature in excess of about 800° F. and below 1800° F. thereby effecting drying and partial roasting of the ore, discharging the stream of gas containing the dispersed suspension of particles not greater than 40 mesh from the first zone at a point above the fluidized bed, withdrawing a portion of large size particles of ore from the fluidized bed of solids in the first zone, crushing said large particles, returning said crushed ore to the first zone for further contact with the upwardly rising stream of gas therein, passing said stream of gas containing the dispersed suspension of particles not greater than 40 mesh through a second suspension-roasting zone larger than the first zone in which second zone the dispersed suspension of particles are further roasted, introducing additional gas containing oxygen into the suspension-roasting zone to maintain a temperature in excess of 1800° F. therein and to effect substantially complete oxidation of the particles of ore in dispersed suspension, discharging $SO_2$ containing gas and roasted ore from the suspension-roasting zone, and separating cinder from the discharged gas.

4. A continuous two-stage fluid-suspension process for converted iron sulfide ore into sulfur dioxide and low-sulfur cinder which comprises introducing the ore into and maintaining a fluidized bed composed of divided sulfide ore particles and particles of an inert grinding medium having a particle size within the range of about 1/8" diameter to about 40 mesh supported on a perforated plate in a first zone, passing a stream of gas containing oxygen upwardly through the perforated plate and fluidized bed containing inert grinding medium and ore at a velocity sufficiently high to maintain the solids in the bed of a particle size greater than 40 mesh in a fluid state and to elutriate from the fluidized bed solids of particle size not greater than 40 mesh as a dispersed suspension carried by the stream of gas leaving the top of the fluidized bed, regulating the rate of introduction of ore and gas containing oxygen into the first zone to maintain therein a temperature between about 1300° F. and 1500° F., thereby effecting drying and partial roasting of the ore, discharging the stream of gas containing the dispersed suspension of particles not greater than 40 mesh from the first zone at a point above the fluidized bed, withdrawing a portion of large size particles of ore from the fluidized bed of solids in the first zone, crushing said large particles, returning said crushed ore to the first zone for further contact with the upwardly rising stream of gas therein, passing said stream of gas containing the dispersed suspension of particles not greater than 40 mesh through a second suspension-roasting zone larger than the first zone in which second zone the dispersed suspension of particles are further roasted, introducing additional gas containing oxygen into the suspension-roasting zone to maintain a temperature in excess of 1800° F. therein and to effect substantially complete oxidation of the particles of ore in dispersed suspension, discharging $SO_2$ containing gas and roasted ore from the suspension-roasting zone, separating cinder from the discharged gas, cooling the $SO_2$ containing gas, and introducing a portion of the cooled $SO_2$ containing gas into the first zone below the perforated plate to provide a sufficiently high gas velocity to maintain the solids as a fluidized bed and to elutriate from the fluidized bed finely divided particles of ore of a size not greater than 40 mesh.

5. A continuous two-stage fluid-suspension process for converting iron sulfide ore into sulfur dioxide and low-sulfur cinder which comprises introducing the ore into and maintaining a fluidized bed composed of divided sulfide ore particles and particles of an inert grinding material ranging in particle size from about $\frac{1}{8}"$ diameter down to a size not to exceed about 50 mesh in fineness supported on a perforated plate in a first zone, passing a stream of gas containing oxygen upwardly through the perforated plate and fluidized bed containing inert grinding medium and ore at a velocity sufficiently high to maintain the solids in the bed of a particle size greater than 40 mesh in a fluid state and to elutriate from the fluidized bed solids of particle size not greater than 40 mesh as a dispersed suspension carried by the stream of gas leaving the top of the fluidized bed, regulating the rate of introduction of ore and gas containing oxygen into the first zone to maintain therein a temperature between 1300° F. and 1500° F., thereby effecting drying and partial roasting of the ore, discharging the stream of gas containing the dispersed suspension of particles not greater than 40 mesh from the first zone at a point above the fluidized bed, withdrawing a portion of large size particles of ore, crushing said large particles, returning said crushed ore to the first zone for further contact with the upwardly rising stream of gas therein, passing said stream of gas containing the dispersed suspension of particles not greater than 40 mesh through a second suspension-roasting zone larger than the first zone in which second zone the dispersed suspension of particles are further roasted, introducing additional gas containing oxygen into the suspension-roasting zone to maintain a temperature in excess of 1800° F. therein and to effect substantially complete oxidation of the particles of ore in dispersed suspension, discharging $SO_2$ containing gas and roasted ore from the suspension-roasting zone, separating cinder from the discharged gas, cooling the $SO_2$ containing gas, recycling a portion of the cooled $SO_2$ containing gas to the suspension-roasting zone at a point near the discharge of gas therefrom to aid in maintaining a temperature of approximately 1800° F. at said point of discharge, and introducing a portion of the cooled $SO_2$ containing gas into the first zone below the perforated plate to provide a sufficiently high gas velocity to maintain the solids as a fluidized bed and to elutriate from the fluidized bed finely divided particles of ore of a size not greater than 40 mesh.

References Cited in the file of this patent

UNITED STATES PATENTS

| | | |
|---|---|---|
| 1,912,621 | Clark | June 6, 1933 |
| 1,941,592 | Bacon | Jan. 2, 1934 |
| 1,958,278 | Miller | May 8, 1934 |
| 2,339,932 | Kuhl | Jan. 25, 1944 |
| 2,412,667 | Arveson | Dec. 17, 1946 |
| 2,436,225 | Ogorzaly | Feb. 17, 1948 |
| 2,468,521 | Sweetser | Apr. 20, 1949 |
| 2,503,788 | White | Apr. 11, 1950 |
| 2,536,952 | McBean | Jan. 2, 1951 |
| 2,538,219 | Welty | Jan. 16, 1951 |
| 2,560,478 | Roetheli | July 10, 1951 |
| 2,568,400 | Kearby | Sept. 18, 1951 |
| 2,595,365 | Odell | May 6, 1952 |
| 2,625,464 | Roberts | Jan. 13, 1953 |
| 2,637,629 | Lewis | May 5, 1953 |
| 2,638,684 | Jukkola | May 19, 1953 |
| 2,650,159 | Tarr, Jr. et al. | Aug. 25, 1953 |
| 2,677,608 | McKay | May 4, 1954 |